(12) United States Patent
Niiyama et al.

(10) Patent No.: US 10,386,664 B2
(45) Date of Patent: Aug. 20, 2019

(54) ADHESIVE LAYER-EQUIPPED TRANSPARENT PLATE AND DISPLAY DEVICE

(71) Applicant: AGC Inc., Chiyoda-ku (JP)

(72) Inventors: Satoshi Niiyama, Chiyoda-ku (JP); Masahiro Inoue, Chiyoda-ku (JP); Kazushige Ota, Chiyoda-ku (JP); Yu Nojiri, Chiyoda-ku (JP); Hitoshi Tsushima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 51 days.

(21) Appl. No.: 15/151,015

(22) Filed: May 10, 2016

(65) Prior Publication Data

US 2016/0252769 A1 Sep. 1, 2016

Related U.S. Application Data

(63) Continuation of application No. PCT/JP2014/079371, filed on Nov. 5, 2014.

(30) Foreign Application Priority Data

Nov. 15, 2013 (JP) ................. 2013-236910

(51) Int. Cl.
*G02F 1/1333* (2006.01)
*B32B 7/12* (2006.01)
*B32B 3/08* (2006.01)

(52) U.S. Cl.
CPC .......... *G02F 1/133308* (2013.01); *B32B 3/08* (2013.01); *B32B 7/12* (2013.01);
(Continued)

(58) Field of Classification Search
CPC .................................................. G02F 2202/28
See application file for complete search history.

(56) References Cited

U.S. PATENT DOCUMENTS 8,268,447 B2 9/2012 Niiyama et al.
8,310,649 B2 11/2012 Niiyama et al.
(Continued)

FOREIGN PATENT DOCUMENTS

JP 3-161720 7/1991
JP 2003-255847 9/2003
(Continued)

OTHER PUBLICATIONS

Machine translation of Shiozawa et al., JP2003-255847.*
(Continued)

*Primary Examiner* — Ian A Rummel
(74) *Attorney, Agent, or Firm* — Oblon, McClelland, Maier & Neustadt, L.L.P.

(57) ABSTRACT

To provide an adhesive layer-equipped transparent plate which makes it easy to bond a display device to a transparent support such as a glass plate and which can suppress a decrease in the image quality.
The adhesive layer-equipped transparent plate 1 of the present invention comprises a transparent plate 2 having a first surface and a second surface, a light-shielding portion 3 provided on at least one of the periphery of the first surface 2a and the periphery of the second surface 2b of the transparent plate 2, a first adhesive layer 4 provided on the first surface 2a of the transparent plate 2, and a second adhesive layer 5 provided on the second surface 2b of the transparent plate 2, in a formation region with an area smaller than the formation region of the first adhesive layer 4.

14 Claims, 4 Drawing Sheets

(52) U.S. Cl.
CPC ..... *B32B 2307/412* (2013.01); *B32B 2457/20* (2013.01); *G02F 2001/133331* (2013.01); *G02F 2202/28* (2013.01)

(56) References Cited

U.S. PATENT DOCUMENTS

| | | | |
|---|---|---|---|
| 8,524,839 B2 | 9/2013 | Kadowaki et al. | |
| 8,592,039 B2 | 11/2013 | Niiyama et al. | |
| 2008/0286548 A1* | 11/2008 | Ellison | C03B 17/06 428/220 |
| 2012/0328873 A1* | 12/2012 | Kishioka | B32B 7/12 428/337 |
| 2013/0029075 A1 | 1/2013 | Niiyama et al. | |
| 2013/0177748 A1 | 7/2013 | Hirai et al. | |
| 2013/0342971 A1* | 12/2013 | Jacobs | G02F 1/133308 361/679.01 |
| 2014/0036170 A1* | 2/2014 | Nashiki | G06F 3/044 349/12 |
| 2014/0055831 A1* | 2/2014 | Johnson | E06B 9/24 359/238 |
| 2014/0335316 A1* | 11/2014 | Fukushima | B32B 7/12 428/161 |
| 2015/0015812 A1* | 1/2015 | Takakusagi | G06F 3/044 349/12 |

FOREIGN PATENT DOCUMENTS

| | | |
|---|---|---|
| JP | 2011-27975 | 2/2011 |
| JP | 2012-121978 | 6/2012 |
| JP | 2012-123231 | 6/2012 |
| JP | 2013-143130 | 7/2013 |
| JP | 2014-58596 | 4/2014 |
| WO | WO 2011/148990 A1 | 12/2011 |

OTHER PUBLICATIONS

Machine translation of Iwanaga et al., JP2012-121978.*
International Search Report dated Jan. 20, 2015 in PCT/JP2014/079371 filed on Nov. 5, 2014.
U.S. Appl. No. 13/914,033, filed Jun. 10, 2013, 2013/0273266 A1, Satoshi Niiyama, et al.
U.S. Appl. No. 13/914,273, filed Jun. 10, 2013, 2013/0273267 A1, Satoshi Niiyama, et al.
U.S. Appl. No. 14/684,466, filed Apr. 13, 2015, 2015/0212350 A1, Satoshi Niiyama, et al.
U.S. Appl. No. 14132,641, filed Dec. 18, 2013, 2014/0178619 A1, Satoshi Niiyama, et al.
U.S. Appl. No. 14/748,696, filed Jun. 24, 2015, 2015/0314573 A1, Satoshi Niiyama, et al.

* cited by examiner

ADHESIVE LAYER-EQUIPPED TRANSPARENT PLATE AND DISPLAY DEVICE

CROSS REFERENCE TO RELATED APPLICATION

This application is a continuation of PCT/JP2014/079371, filed on Nov. 5, 2014, and claims priority to Japanese Patent Application No. 2013-236910, filed on Nov. 15, 2013.

TECHNICAL FIELD

The present invention relates to an adhesive layer-equipped transparent plate and a display device.

BACKGROUND ART

For the purpose of protecting a display surface of a display panel of e.g. a liquid crystal display device and an organic electroluminescence display device, it has been known to bond a transparent plate equipped with an adhesive layer to the display panel. Hereinafter, an organic electroluminescence display device will be referred to simply as an organic EL display device. For example, the following Patent Document 1 discloses a transparent plate having an adhesive layer, having such properties that when it is bonded to a display panel, voids are less likely to remain at the interface between the display panel and the adhesive layer.

PRIOR ART DOCUMENT

Patent Document

Patent Document 1: WO2011/148990

DISCLOSURE OF INVENTION

Technical Problem

In recent years, use of a display device in such a manner that it is bonded to a store window or a glass wall of an office so that the display surface faces outside, has been studied. By such a manner, the display device can be utilized as a billboard, an advertising display, etc., since passersby can recognize the display through the glass from the outside of the store or the office. However, if the display device as disclosed in Patent Document 1 is to be bonded to glass, it is necessary to further dispose an adhesive material on the opposite side of the transparent plate from a side on which the adhesive layer is provided. In such a case, the operation of bonding the display device is troublesome and in addition, it is difficult to fix the display device on glass in some cases. Further, the display quality may decrease in some cases depending upon the manner of bonding. Further, in a case where the display device is bonded to e.g. a glass wall, workability, easiness to restore to original state, etc. are required.

According to one embodiment of the present invention, an adhesive layer-equipped transparent plate which makes it easy to bond a display device to a transparent support such as a glass plate and which can fix the display device, is provided. Further, according to another embodiment of the present invention, a display device which comprises an adhesive layer-equipped transparent plate and which is excellent in the display quality, is provided.

Solution To Problem

The adhesive layer-equipped transparent plate according to one embodiment of the present invention comprises a transparent plate having a first surface and a second surface, a light-shielding portion provided on at least one of the periphery of the first surface and the periphery of the second surface of the transparent plate, a first adhesive layer provided on the first surface of the transparent plate, and a second adhesive layer provided on the second surface of the transparent plate, in a formation region with an area smaller than a formation region of the first adhesive layer.

In the adhesive layer-equipped transparent plate according to one embodiment of the present invention, the first adhesive layer is preferably provided on the entire first surface of the transparent plate.

In the adhesive layer-equipped transparent plate according to one embodiment of the present invention, it is preferred that the light-shielding portion is provided on the periphery of the second surface, and the second adhesive layer is provided on both a region surrounded by the light-shielding portion and a region planarly overlapping with a part of the light-shielding portion.

In the adhesive layer-equipped transparent plate according to one embodiment of the present invention, it is preferred that each of the shear moduli of the first adhesive layer and the second adhesive layer is from $10^2$ to $10^5$ Pa.

The display device according to one embodiment of the present invention comprises an adhesive layer-equipped transparent plate, a transparent support bonded to a first surface of the adhesive layer-equipped transparent plate, and a display device main body bonded to a second surface of the adhesive layer-equipped transparent plate, wherein the adhesive layer-equipped transparent plate comprises a transparent plate having a first surface and a second surface, a light-shielding portion provided on at least one of the periphery of the first surface and the periphery of the second surface of the transparent plate, a first adhesive layer provided on the first surface of the transparent plate, and a second adhesive layer provided on the second surface of the transparent plate, in a formation region with an area smaller than a formation region of the first adhesive layer, the transparent support is bonded to the transparent plate via the first adhesive layer, and the display device main body is bonded to the transparent plate via the second adhesive layer.

In the display device according to one embodiment of the present invention, it is preferred that the interfacial adhesive forces between the first adhesive layer and the transparent support and between the first adhesive layer and the transparent plate are larger than the interfacial adhesive forces between the second adhesive layer and the display device main body and between the second adhesive layer and the transparent plate.

In the display device according to one embodiment of the present invention, it is preferred that the interfacial adhesive force between the first adhesive layer and the transparent support is smaller than the interfacial adhesive force between the first adhesive layer and the transparent plate.

The display device according to one embodiment of the present invention preferably further has a support member supporting a part of the display device main body, fixed to a region other than the formation region of the second adhesive layer on the second surface of the transparent plate.

In the display device according to one embodiment of the present invention, the light-shielding portion may be provided on the first surface of the transparent plate, and the support member may be fixed to the second surface of the transparent plate.

In the display device according to one embodiment of the present invention, the light-shielding portion may be provided on the second surface of the transparent plate, and the support member may be fixed to the light-shielding portion.

Advantageous Effects of Invention

According to one embodiment of the present invention, an adhesive layer-equipped transparent plate which makes it easy to bond a display device to a transparent support such as a glass plate and which can fix the display device, is provided. According to one embodiment of the present invention, a display device which comprises an adhesive layer-equipped transparent plate and which is excellent in the display quality, is provided.

DESCRIPTION OF EMBODIMENTS

[First Embodiment]

Now, the first embodiment of the present invention will be described with reference to FIGS. 1 to 4.

In the following drawings, in order to make various components easily understandable, the respective components may be shown as differentiated in their sizes.

In this specification, "transparent" means that after a plate and a display surface of a display device main body are bonded via an adhesive layer without a void space, whole or part of a display image on the display device main body is visible through the plate substantially without optical distortion. Accordingly, a plate can be regarded as "transparent" so long as a display image on a display device main body is visible substantially without optical distortion through the plate even if part of light which enters the plate from the display device main body is adsorbed or reflected by the plate, or even if the plate has a low visible light transmittance e.g. by a change in the optical phase.

<Adhesive Layer-equipped Transparent Plate>

Figure 1:
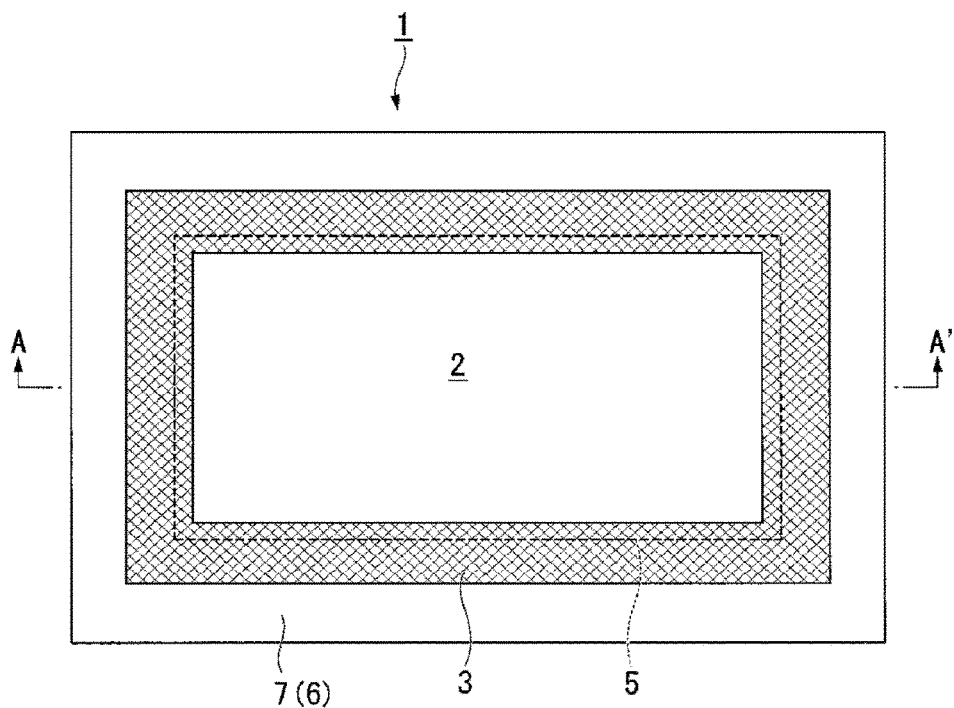
FIG. 1 is a plan view illustrating an adhesive layer-equipped transparent plate according to a first embodiment.
Figure 2:
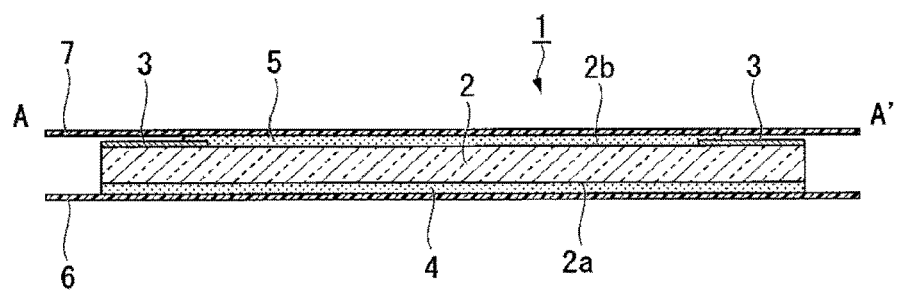
FIG. 2 is a cross-sectional view along the line A-A' in FIG. 1.

FIG. 1 is a plan view illustrating an adhesive layer-equipped transparent plate 1 according to a first embodiment. FIG. 2 is a cross-sectional view along the line A-A' in FIG. 1.

As shown in FIG. 2, the adhesive layer-equipped transparent plate 1 according to a first embodiment comprises a transparent plate 2 having a first surface 2a and a second surface 2b, a light-shielding portion 3, a first adhesive layer 4, a second adhesive layer 5, a first protective film 6 and a second protective film 7. The light-shielding portion 3 is provided on the periphery of the second surface 2b of the transparent plate 2. The first adhesive layer 4 is provided on the first surface 2a of the transparent plate 2. The second adhesive layer 5 is provided on the second surface 2b of the transparent plate 2, and is provided on a formation region smaller than a formation region of the first adhesive layer 4.

(Transparent Plate)

The transparent plate 2 is a member in the form of a plate, which is a core material of the adhesive layer-equipped transparent plate 1 and which, when the after-mentioned display device main body is bonded to a transparent support, is to be interposed between the display device and the transparent support. The transparent plate 2 may, for example, be a glass plate or a resin plate. The transparent plate 2 is most preferably a glass plate in view of high transparency to an injected light and a reflected light from the display device main body and in addition, in view of light resistance, low birefringence, high plane accuracy, surface abrasion resistance and high mechanical strength. The transparent plate 2 is preferably a glass plate also in view of high transmittance to light which cures a photocurable resin composition constituting the first adhesive layer 4 and the second adhesive layer 5.

As an example of a glass plate, a glass material such as soda lime glass may be mentioned. Further, the glass plate is more preferably a high transmission glass (commonly called white plate glass) having a lower iron content and less bluish tone. In order to increase the safety, reinforced glass may be used as the surface material. Especially when a thin glass plate is to be used, it is preferred to employ a glass plate subjected to chemical tempering. When the transparent plate 2 is bonded to a transparent support via the first adhesive layer 4, the entire or a part of the transparent plate 2 may be curved, and to prevent breakage of the transparent plate 2 on that occasion, a chemically tempered glass plate is preferred. As examples of the resin plate, a highly transparent resin material such as polycarbonate or polymethyl methacrylate may be mentioned.

The transparent plate 2 may be subjected to surface treatment to improve the interfacial adhesion to the first adhesive layer 4 and the second adhesive layer 5. The surface treatment method may, for example, be a method of treating the surface of the transparent plate 2 with a silane coupling agent or a method of forming a silicon oxide thin film by oxidizing flame by a flame burner.

The shape of the transparent plate 2 may be determined in accordance with the planar shape of the display device main body which is to be bonded, and is rectangular as an example as shown in FIG. 1. The thickness of the transparent plate 2 is preferably from about 0.2 to about 2.0 mm in the case of a glass plate, in view of mechanical strength, transparency, etc. In order that an observer does not feel that the display recedes deep (i.e. a sense of depth) strongly, the thickness of the transparent plate 2 is more preferably from about 0.2 to about 0.7 mm. In the case of a resin plate, the thickness of the transparent plate 2 is preferably from about 0.1 to about 1.0 mm. In order that the observer does not strongly feel a sense of depth of the display, the thickness of the transparent plate 2 is more preferably from about 0.1 to about 0.3 mm.

(Light-shielding Portion)

The light-shielding portion 3 is to shield wiring members such as a flexible printed wiring board connected to the display device main body so that a region other than the image display region (i.e. a region outside the image display region) of the display device main body when the display device main body is bonded is not seen. In the case of this embodiment, the light-shielding portion 3 is bonded to the second surface 2b on the side to which the display device main body is to be bonded, between the two surfaces 2a and 2b of the transparent plate 2. And, the light-shielding portion 3 is formed, as shown in FIG. 1, in a frame form on the periphery along four sides of the rectangular transparent plate 2 as observed from a normal direction of the transparent plate 2. The opening region on the inner side of the light-shielding portion 3 substantially agrees with the image display region of the display device main body when the display device main body is bonded.

In a case where the transparent plate 2 is a glass plate, it is preferred to form the light-shielding portion 3 by a printing method such as ceramic printing with a black pigment, whereby high shielding properties are obtained. In a case where the transparent plate 2 is a chemically tempered glass plate, the firing temperature of the transparent plate 2 at the time of printing may be lowered by using an organic material as a light-shielding ink. However, the light-shielding portion 3 may not necessarily be formed by a printing method. For example, a separately prepared light-shielding portion 3 may be bonded to the transparent plate 2. Further, the light-shielding portion 3 may be formed by various thin film formation methods or by a surface modification treatment method for the transparent plate.

(First Adhesive Layer)

The first adhesive layer 4 is to bond the adhesive layer-equipped transparent plate 1 to a transparent support such as window glass. The first adhesive layer 4 is provided on the first surface 2a on a side to be bonded to the transparent support, between the two surfaces 2a and 2b of the transparent plate 2. The first adhesive layer 4 may be provided on a part of the first surface 2a of the transparent plate 2, but it is preferably provided on the entire first surface 2a. The reason is such that when the first adhesive layer 4 is provided on the entire first surface 2a, the adhesive layer-equipped transparent plate 1 is strongly bonded to the transparent support and in addition, the boundary between a region where the first adhesive layer 4 is present and a region where it is not, is hardly recognizable. The first adhesive layer 4 is constituted by a transparent resin obtained by curing the after-mentioned liquid photocurable resin composition. Further, a touch sensor (not shown) may be provided between the transparent plate 2 and the first adhesive layer 4.

The shear modulus of the first adhesive layer 4 is preferably within a range of from $10^2$ to $10^5$ Pa, more preferably within a range of from $10^3$ to $10^4$ Pa. When the shear modulus of the first adhesive layer 4 is at least $10^2$ Pa, the shape of the first adhesive layer 4 tends to be maintained. Further, when the shear modulus of the first adhesive layer 4 is at least $10^2$ Pa, the transparent plate 2 and a member bonded to the second adhesive layer 5 on the transparent plate 2 can be sufficiently fixed to the transparent support, and at the time of bonding the adhesive layer-equipped transparent plate 1 and the transparent support, the first adhesive layer 4 will be less likely to be deformed by e.g. the pressure at the time of bonding. On the other hand, when the shear modulus of the first adhesive layer 4 is at most $10^5$ Pa, even if air bubbles are formed at the time of bonding the adhesive layer-equipped transparent plate 1 and the transparent support, such air bubbles will disappear in a short time and will be less likely to remain, such being desirable.

The thickness of the first adhesive layer 4 is preferably from about 0.1 to about 2.0 mm, more preferably from about 0.2 to about 0.8 mm. When the thickness of the first adhesive layer 4 is at least 0.1 mm, the first adhesive layer 4 will effectively absorb a shock by an external force from the transparent support side, etc. and can thereby protect the display device main body. Further, even if a foreign matter not exceeding the thickness of the adhesive layer 4 is included between the transparent support and the adhesive layer-equipped transparent plate 1, the thickness of the first adhesive layer 4 will not change substantially, and there will be little influence to the light transmitting performance. When the thickness of the first adhesive layer 4 is at most 2.0 mm, it becomes easy to bond the transparent plate 2 to the transparent support via the first adhesive layer 4, and the entire thickness of the display device will not become unnecessarily thick.

A photocurable resin composition as the material of the first adhesive layer 4 is a liquid composition comprising a curable compound (II) having photocurability, a photopolymerization initiator (C2) and as the case requires, a non-curable oligomer (D). The non-curable oligomer (D) is an oligomer having a hydroxy group which does not undergo curing reaction with the curable compound (II) in the composition at the time of curing the photocurable resin composition.

(Curable Compound (II))

The curable compound (II) in the photocurable resin composition is at least one type of curable compound which undergoes curing reaction at the time of curing the photocurable resin composition. At least one of such photocurable compound is a compound (IIa) having a hydroxy group which does not react at the time of curing the photocurable resin composition. When the curable compound (II) contains the compound (IIa), a hydroxy group is present in a cured product obtained by curing the curable compound (II) by itself. Presence of a hydroxy group contributes to stabilization of the non-curable oligomer in the photocurable resin composition. Accordingly, the compound (IIa) having a hydroxy group which does not react at the time of curing may be any compound such that an unreacted hydroxy group is present after the curing reaction, and for example, the compound (IIa) may be such that some of hydroxy groups remain unreacted without undergoing the curing reaction although the other hydroxy groups underwent curing reaction.

The compound (IIa) having a hydroxy group which does not react at the time of curing is a compound having a curable group which contributes to curing reaction and which has a hydroxy group, and it may be a monomer or may be an oligomer having repeating units. The compound (IIa) is preferably a monomer having a curable group and having a hydroxy group, with a view to easily adjusting the viscosity of the photocurable composition which is not yet cured.

The curable compound (II) preferably comprises at least one type of oligomer (A') having a curable group and having a number average molecular weight of from 1,000 to 100,000 and at least one type of monomer (B') having a curable group and having a molecular weight of from 125 to 600. When this type of curable compound (II) is used, it is easy to adjust the viscosity of the photocurable resin composition to be within a preferred range. In such a case, it is preferred to use, as at least a part of the monomer (B'), a monomer (B3) having a curable group and a hydroxy group and having a molecular weight of from 125 to 600.

The curable group in the oligomer (A') or the monomer (B') may, for example, be an addition-polymerizable unsaturated group (such as an acryloyloxy group or a methacryloyloxy group), or a combination of an unsaturated group and a thiol group. Among them, at least one group selected from an acryloyloxy group and a methacryloyloxy group is preferred from such a viewpoint that the curing speed is high, and a highly transparent first adhesive layer 4 is thereby obtainable.

The curable group in the oligomer (A') and the curable group in the monomer (B') may be the same or different from each other. The curable group in the relatively high molecular weight oligomer (A') tends to have a lower reactivity than the curable group in the relatively low molecular weight monomer (B'). Therefore, it is likely that curing of the monomer (B') proceeds first to rapidly increase the viscosity of the entire composition, whereby the curing reaction tends to be non-uniform. In order to minimize the difference in the reactivity of the curable groups in both and to obtain a uniform first adhesive layer 4, it is more preferred to adjust the curable group in the oligomer (A') to be an acryloyloxy group having a relatively high reactivity and to adjust the curable group in the monomer (B') to be a methacryloyloxy group having a relatively low reactivity. In order to shorten the time required for the curing reaction or to increase the adhesive force of the first adhesive layer 4, it is preferred to adjust each of the curable groups in the oligomer (A') and the monomer (B') to be an acryloyloxy group.

(Oligomer (A'))

The number average molecular weight of the oligomer (A') is from 1,000 to 100,000, preferably from 10,000 to 70,000. When the number average molecular weight of the oligomer (A') is within this range, it is easy to adjust the viscosity of the photocurable resin composition to be within the above range. The number average molecular weight of the oligomer (A') is a number average molecular weight calculated as polystyrene, obtained by the measurement of GPC. Here, in a case where in the measurement of GPC, a peak of an unreacted low molecular component (such as a monomer) appears, the number average molecular weight is obtained by excluding such a peak.

The oligomer (A') is preferably one having from 1.8 to 4 curable groups per one molecule on average, in view of the curability of the photocurable resin composition and mechanical properties of the first adhesive layer 4. The oligomer (A') may, for example, be a urethane oligomer having a urethane bond, a poly(meth)acrylate of a polyoxyalkylene polyol or a poly(meth)acrylate of a polyester polyol. A urethane oligomer (A2) is preferred from such a viewpoint that it is possible to widely adjust the mechanical properties of the resin after curing, the adhesion to the plate, etc. by e.g. designing the molecule of the urethane chain.

The urethane oligomer (A2) is preferably one synthesized by a method wherein a polyol and a polyisocyanate are reacted to obtain a prepolymer having an isocyanate group, and then, a monomer (B2) is reacted to the isocyanate group of the prepolymer. The polyol and the polyisocyanate may be known compounds, for example, polyol (i), diisocyanate (ii), etc. disclosed as raw materials for a urethane oligomer (a) disclosed in WO2009/016943, which are incorporated in this specification by reference.

The content proportion of the oligomer (A') is preferably from 20 to 90 mass %, more preferably from 30 to 80 mass %, in the entirety (100 mass %) of the curable compound (II), i.e. the sum (100 mass %) of the oligomer (A') and the monomer (B'). When the proportion of the oligomer (A') is at least 20 mass %, the heat resistance of the first adhesive layer 4 will be good. When the proportion of the oligomer (A') is at most 90 mass %, the curability of the photocurable resin composition and the adhesion between the transparent plate 2 and the first adhesive layer 4 will be good.

(Monomer (B'))

The molecular weight of the monomer (B') is from 125 to 600, preferably from 140 to 400. When the molecular weight of the monomer (B') is at least 125, it is possible to prevent volatilization of the monomer at the time of forming the first adhesive layer 4 by using a reduced pressure means. When the molecular weight of the monomer (B') is at most 600, the adhesion between the transparent plate 2 and the first adhesive layer 4 will be good. The monomer (B') is preferably one having from 1 to 3 curable groups per one molecule, from the viewpoint of the curability of the photocurable resin composition and the mechanical properties of the first adhesive layer 4. The content proportion of the monomer (B') is preferably from 10 to 80 mass %, more preferably from 20 to 70 mass %, in the entirety (100 mass %) of the curable compound (II), i.e. the sum (100 mass %) of the oligomer (A') and the monomer (B').

The monomer (B') preferably contains a monomer (B3) having a curable group and a hydroxy group. The monomer (B3) will contribute to stabilization of the non-curable oligomer (D). Further, when the monomer (B3) is incorporated, good adhesion between the transparent plate 2 and the first adhesive layer 4 will be readily obtainable. The monomer (B3) having a hydroxy group is particularly preferably 2-hydroxybutyl methacrylate or 4-hydroxybutyl acrylate. The content proportion of the monomer (B3) is preferably from 10 to 60 mass %, more preferably from 20 to 50 mass %, in the entirety (100 mass %) of the curable compound (II), i.e. the sum (100 mass %) of the oligomer (A') and the monomer (B'). When the content proportion of the monomer (B3) is at least 10 mass %, it is possible to readily obtain the effect to improve the stability of the photocurable resin composition and the effect to improve the adhesion between the transparent plate 2 and the first adhesive layer 4.

The monomer (B') preferably contains the following monomer (B4). When the content of the monomer (B4) is higher than the content of the monomer (B3) having a hydroxy group by mass ratio, the time tends to be short until air bubbles formed in the first adhesive layer 4 disappear when the display device main body and the adhesive layer-equipped transparent plate 1 are bonded in a reduced pressure atmosphere and then the assembly is returned to an atmospheric pressure atmosphere. On the other hand, if the monomer (B4) is contained, the time required for curing the photocurable resin composition tends to be long.

The monomer (B4) is constituted by at least one member selected from the group consisting of alkyl acrylates and alkyl methacrylates having a $C_{8-22}$ alkyl group. The monomer (B4) may, for example, be n-decyl acrylate, n-dodecyl acrylate, n-dodecyl methacrylate, isooctadecyl acrylate, n-octadecyl methacrylate, n-behenyl methacrylate, etc., and n-dodecyl acrylate, n-dodecyl methacrylate or n-octadecyl methacrylate, is preferred. The content proportion of the monomer (B4) is preferably from 5 to 50 mass %, more preferably from 15 to 40 mass % in the entirety (100 mass %) of the curable compound (II) i.e. the sum (100 mass %) of the oligomer (A') and the monomer (B'). When the content proportion of the monomer (B4) is at least 5 mass %, sufficient effects by addition of the monomer (B4) tend to be obtained.

(Photopolymerization Initiator (C2))

The photopolymerization initiator (C2) contained in the photocurable resin composition may be a photopolymerization initiator of e.g. acetophenone type, ketal type, benzoin or benzoin ether type, phosphine oxide type, benzophenone type, thioxanthone type or quinone type. A phosphine oxide type or thioxanthone type photopolymerization initiator is preferred, and with a view to preventing coloration after the photopolymerization reaction, a phosphine oxide type is particularly preferred. In a case where the photopolymerization is carried out by high intensity light irradiation, it is preferred to use an acetophenone type photopolymerization initiator, whereby the curing speed may be increased. The content of the photopolymerization initiator (C2) in the photocurable resin composition is preferably from 0.01 to 10 parts by mass, more preferably from 0.1 to 5 parts by mass, to 100 parts by mass of the entirety of the curable compound (II) i.e. the sum of the oligomer (A') and the monomer (B').

(Non-curable Oligomer (D))

The non-curable oligomer (D) is an oligomer having a hydroxy group which does not undergo a curing reaction with the curable compound (II) in the composition at the time of curing the photocurable resin composition. The number of hydroxy groups per one molecule of the non-curable oligomer (D) is preferably from 0.8 to 3, more preferably from 1.8 to 2.3. The number average molecular weight (Mn) per one hydroxy group, of the non-curable oligomer (D), is preferably from 400 to 8,000. When the number average molecular weight per one hydroxy group is at least 400, the polarity of the non-curable oligomer (D) will not be too high, and good compatibility with the curable compound (II) in the photocurable resin composition is readily obtainable. When the number average molecular weight per one hydroxy group is at most 8,000, it is possible to readily obtain the effect to stabilize the non-curable oligomer (D) after curing, by an interaction between the hydroxy group derived from the curable compound (II) and the hydroxy group of the non-curable oligomer (D). It is considered that a hydrogen bond contributes to such an interaction. Such non-curable oligomers (D) may be used alone or in combination of two or more of them.

The non-curable oligomer (D) having a hydroxy group, may, for example, be a polyol having a high molecular weight, and a polyoxyalkylene polyol, a polyester polyol or a polycarbonate polyol is preferred. The polyoxyalkylene polyol may, for example, be a polyoxyalkylene diol such as polyoxyethylene glycol, polyoxypropylene diol, polyoxypropylene triol or polyoxytetramethylene glycol.

The number average molecular weight (Mn) per one hydroxy group, of the polyoxyalkylene polyol is preferably from 400 to 8,000, more preferably from 600 to 5,000. The polyester polyol may, for example, be an aliphatic polyester diol having a residue of an aliphatic diol such as ethylene glycol, propylene glycol or 1,4-butanediol, and a residue of an aliphatic dicarboxylic acid such as glutaric acid, adipic acid or sebacic acid. The polycarbonate polyol may, for example, be an aliphatic polycarbonate diol having a diol residue of e.g. 1,6-hexanediol, or an aliphatic polycarbonate diol such as a ring-opened polymer of an aliphatic cyclic carbonate.

The number average molecular weight (Mn) per one hydroxy group, of the polyester polyol or the polycarbonate polyol is preferably from 400 to 8,000, more preferably from 800 to 6,000. In this specification, the number average molecular weight of the non-curable oligomer (D) is a value calculated by the following formula (1) from the hydroxy value A (KOH mg/g) measured in accordance with JIS K1557-1 (2007 edition) and the number B of hydroxy groups in one molecule of the non-curable oligomer (D).

$$\text{Molecular weight of non-curable oligomer } (D) = 56.1 \times B \times 1000/A \qquad (1)$$

As the non-curable oligomer (D), it is preferred to use a polyoxyalkylene polyol, particularly preferably polyoxypropylene polyol, since the elastic modulus of the first adhesive layer 4 after curing tends to be thereby lower. Further, part of oxypropylene groups in the polyoxypropylene polyol may be substituted by an oxyethylene group. For example, from the viewpoint of compatibility, it is preferred that the oligomer (A') is a urethane oligomer synthesized by using a polyoxyalkylene polyol and a polyisocyanate as raw materials, and the non-curable oligomer (D) is a polyoxyalkylene polyol.

In this embodiment, in order to stabilize the photocurable resin composition when it is not cured and to prevent the non-curable oligomer (D) from being separated from the first adhesive layer 4 after curing, the oligomer (A') and the non-curable oligomer (D) preferably have molecular chains having the same structure or a similar structure. Specifically, it is preferred to use, as a raw material for synthesis of the oligomer (A') in the photocurable resin composition, a compound having a hydroxy group (hereinafter sometimes referred to as a hydroxy group-containing compound) such as a polyol and further, to use the same hydroxy group-containing compound as the non-curable oligomer (D). For example, in a case where the oligomer (A') is a urethane oligomer synthesized by using a polyoxyalkylene polyol and a polyisocyanate as raw materials, it is preferred to use the polyoxyalkylene polyol as the non-curable oligomer (D).

Otherwise, in a case where the hydroxy group-containing compound as a raw material of the oligomer (A') is not the same as the hydroxy group-containing compound used as the non-curable oligomer (D), it is preferred that the molecular chains of the oligomer (A') and the non-curable oligomer (D) have partially the same structure such as the same repeating units and further polarities of them are at the same level. To adjust the polarity, for example, a method of introducing a polar group to increase the polarity, a method of substituting part of oxypropylene groups by an oxyethylene group to increase the polarity, or a method of reducing the molecular weight per hydroxy group to increase the polarity may be mentioned. Such methods may be combined.

For example, in a case where the oligomer (A') is a urethane oligomer synthesized by using as raw materials a polyoxypropylene polyol (a') having part of oxypropylene groups substituted by an oxyethylene group and a polyisocyanate, it is preferred to use as the non-curable oligomer (D) a polyoxypropylene polyol having no oxyethylene group and having a molecular weight per hydroxy group lower than that of the polyol (a').

As an example of the most preferred photocurable resin composition, a composition may be mentioned which comprises as the oligomer (A') a urethane oligomer (A2) obtained by reacting a polyoxypropylene diol having part of oxypropylene groups substituted by an oxyethylene group and a polyisocyanate compound to obtain a prepolymer having isocyanate groups, and reacting the prepolymer and a monomer (B2), as the non-curable oligomer (D) the polyoxypropylene diol having part of oxypropylene groups substituted by an oxyethylene group, which is the same as the raw material of the urethane oligomer (A2), and as the monomer (B') a monomer (B3) having a hydroxy group.

As mentioned above, when the oligomer (A') partially has the same molecular structure as the non-curable oligomer (D), the compatibility of the non-curable oligomer (D) in the composition will further increase. Further, it is considered that by the monomer (B') having a hydroxy group, the non-curable oligomer (D) can be present stably in the cured product by the interaction between the hydroxy group in the molecular structure in the curable compound (II) after curing, and the hydroxy group in the molecular structure of the non-curable oligomer (D).

As another example, a composition may be mentioned which comprises as the oligomer (A') a urethane oligomer (A2) obtained by reacting a polyoxypropylene diol having part of oxypropylene groups substituted by an oxyethylene group and a polyisocyanate compound to obtain a prepolymer having isocyanate groups, and reacting the prepolymer and a monomer (B2), as the non-curable oligomer (D) a polyoxypropylene diol not substituted by an oxyethylene group and having a molecular weight lower than that of the polyoxypropylene diol as the raw material of the urethane oligomer (A2), and as the monomer (B') a monomer (B3) having a hydroxy group. By such a composition also, favorable compatibility of the non-curable oligomer (D) in the composition will be achieved, and the non-curable oligomer (D) will be stably present in the cured product.

The non-curable oligomer (D) in the photocurable resin composition contributes to shortening of a time required for disappearance of air bubbles formed in the interface between the transparent support and the first adhesive layer 4 when the adhesive layer-equipped transparent plate 1 and the transparent support are bonded in a reduced pressure atmosphere and then the laminate is retuned to an atmospheric pressure atmosphere. If the content of the non-curable oligomer (D) in the photocurable resin composition is too low, no desired effects may be obtained, and if the content is too high, curing of the first adhesive layer 4 may be insufficient. If curing of the first adhesive layer 4 is insufficient, it may be difficult to peel the first protective film 6 from the first adhesive layer 4 after curing. Accordingly, the content of the non-curable oligomer (D) in the photocurable resin composition is preferably set so as not to cause the above disadvantages, considering the balance with other components, within a range of from 10 to 70 mass % in the entirety (100 mass %) of the photocurable resin composition.

For example, in a case where the photocurable resin composition contains a monomer (B3) having a hydroxy group and a monomer (B4) having an alkyl group, in a content of the monomer (B4) of from 0.6 to 2.5 based on the content (mass basis) of the monomer (B3) being 1, and contains no chain transfer agent, the content of the non-curable oligomer (D) is preferably from 30 to 70 mass %, more preferably from 40 to 70 mass % in the entirety (100 mass %) of the photocurable resin composition.

A chain transfer agent also contributes to shortening of a time required for disappearance of air bubbles. In a case where the photocurable resin composition contains a chain transfer agent within a range of at most 1 part by mass per 100 parts by mass of the entirety of the curable compound (II) and the content of the monomer (B4) is lower than that of the monomer (B3), the content of the non-curable oligomer (D) is preferably from 40 to 70 mass %, more preferably from 50 to 70 mass % in the entirety of the photocurable resin composition for forming a layered portion.

In a case where the content of the monomer (B4) is from 1 to 4 based on the content (mass basis) of the monomer (B3) being 1, and the chain transfer agent is contained within a range of at most 1 part by mass per 100 parts by mass of the entirety of the curable compound (II), the content of the non-curable oligomer (D) is preferably from 5 to 55 mass %, more preferably from 10 to 50 mass %, further preferably from 20 to 40 mass % in the entirety of the photocurable resin composition. If the monomer (B4) or the chain transfer agent is added, the curing rate tends to be low, and accordingly their contents are preferably lower from such a viewpoint. In a case where the content of the monomer (B4) is less than 0.6 by mass ratio based on the content (mass basis) of the monomer (B3) being 1, and no chain transfer agent is contained, the content of the non-curable oligomer (D) is preferably from 40 to 70 mass %, more preferably from 50 to 70 mass %.

(Additives)

The photocurable resin composition may contain, in addition to the curable compound (II), the non-curable oligomer (D) and the photopolymerization initiator (C2), as the case requires, additives such as a polymerization inhibitor, a photocuring accelerator, a chain transfer agent, a photostabilizer (such as an ultraviolet absorber or a radical scavenger), an antioxidant, a flame retardant, an adhesion-improving agent (such as a silane coupling agent), a pigment or a dye, and it preferably contains a polymerization inhibitor, a photostabilizer, an antioxidant or the like. Particularly, when the photocurable resin composition contains a polymerization inhibitor in an amount smaller than the polymerization initiator, the stability of the photocurable resin composition can be improved, and the molecular weight of the layered portion after curing can be adjusted. Further, when the photocurable resin composition contains an antioxidant, the stability of the photocurable resin after curing can be increased. The total content of such additives is preferably at most 10 parts by mass, more preferably at most 5 parts by mass per 100 parts by mass of the entirety of the curable compound (II) i.e. the sum of the oligomer (A') and the monomer (B').

Among the additives, the chain transfer agent is preferably not contained or contained only in a small amount, so as to obtain a favorable curing rate. When a chain transfer agent is contained, the time required for disappearance of air bubbles formed at the time of bonding the transparent support and the adhesive layer-equipped transparent plate 1 tends to be short, and the amount of the non-curable oligomer (D) required to obtain the effect to make the air bubbles well disappear can be reduced. The amount of the chain transfer agent if contained is preferably at most 1 part by mass, more preferably at most 0.5 part by mass per 100 parts by mass of the entirety of the curable compound (II) i.e. the sum of the oligomer (A') and the monomer (B').

To form the first adhesive layer by using the photocurable resin composition, for example, a method of forming the first adhesive layer by photocuring the photocurable resin composition and then applying it to the transparent plate or by applying the non-cured photocurable resin composition to the transparent plate and photocuring the composition may, for example, be mentioned.

(Second Adhesive Layer)

The second adhesive layer 5 is to bond the adhesive layer-equipped transparent plate 1 to the display device main body. The second adhesive layer 5 is provided on the second surface 2b on the side to which the display device main body is to be bonded, between the two surfaces 2a and 2b of the transparent plate 2. The second adhesive layer 5 has a formation area smaller than that of the first adhesive layer 4. Specifically, the second adhesive layer 5 is provided on a part of the second surface 2b of the transparent plate 2, whereas the first adhesive layer 4 is provided on the entire first surface 2a of the transparent plate 2. That is, the second surface 2b of the transparent plate 2 has a region on which the second adhesive layer 5 is provided and a region on which the second adhesive layer 5 is not provided.

The material constituting the second adhesive layer 5 may be the same as or different from the material constituting the first adhesive layer 4. Since the second adhesive layer 5 is bonded to a display panel of a display device, it is preferably bonded without voids under a smaller bonding pressure so as not to impair the display panel. Accordingly, the content of the non-curable component in the curable compound is increased, or the content of the chain transfer agent is adjusted. Further, the second adhesive layer 5 may contain an ultraviolet absorber in an amount smaller than that in the first adhesive layer 4, since an external light which has been transmitted through the first adhesive layer 4 and the transparent plate 2 enters the second adhesive layer 5. The thickness of the second adhesive layer 5 may be the same as or different from the thickness of the first adhesive layer 4. The shear modulus of the second adhesive layer 5 may be the same as or different from the shear modulus of the first adhesive layer 4. Since the second adhesive layer 5 is directly in contact with the display device, it is preferred to use a material constituting the second adhesive layer 5, capable of forming an adhesive layer with a smaller shear modulus, or to make the second adhesive layer 5 thick, in a case where the uniformity of the display image may be impaired by bonding of the transparent plate to a display surface, such as a case of an IPS mode liquid crystal display device.

The second adhesive layer 5 is provided on both a region surrounded by the frame-form light-shielding portion 3 and a region planarly overlapping with a part of the light-shielding portion 3, on the second surface 2b of the transparent plate 2. Since the second adhesive layer 5 is bonded to a portion corresponding to the image display region of the display device main body, it may be provided only on a region surrounded by the light-shielding portion 3, i.e. a region on the inner side of the light-shielding portion 3. However, in a case where the second adhesive layer 5 planarly overlaps with a part of the light-shielding portion 3 as in this embodiment, the region where the second adhesive layer 5 planarly overlaps with a part of the light-shielding portion 3 functions as an alignment margin at the time of position adjustment of the second adhesive layer 5 and the light-shielding portion 3. Accordingly, even if the second adhesive layer 5 and the light-shielding portion 3 are somewhat misaligned, the second adhesive layer 5 will readily be formed on a region surrounded by the light-shielding portion 3. Thus, the display device main body is fixed to the transparent plate 2 with a sufficiently high strength, and in addition, the edge of the second adhesive layer 5 is shielded by the light-shielding portion 3, whereby a decrease in the display quality by the sight of the edge of the second adhesive layer 5 will not occur.

(First Protective Film and Second Protective Film)

The first protective film 6 and the second protective film 7 are to protect the first adhesive layer 4 or the second adhesive layer 5 when the adhesive layer-equipped transparent plate is not in use, and they are peeled from the first adhesive layer 4 or the second adhesive layer 5 when the plate is used. Accordingly, the first protective film 6 and the second protective film 7 are required not to be strongly contact-bonded to the first adhesive layer 4 or the second adhesive layer 5. From such a viewpoint, it is preferred to use, as the first protective film 6 and the second protective film 7, a protective film comprising a base film having a relatively low adhesion to the first adhesive layer or the second adhesive layer, comprising polyethylene, polypropylene, a fluorinated resin or the like, disposed to be in contact with the first adhesive layer 4 or the second adhesive layer 5.

The adhesion on the adhesive face of each of the first protective film 6 and the second protective film 7 is preferably from 0.01 to 1 N, more preferably from 0.02 to 0.6 N, with a test specimen having a width of 50 mm in 180° peel test at a peel rate of 300 mm/min with respect to an acrylic plate. The suitable thickness of each of the first protective film 6 and the second protective film 7 varies depending upon the resin used, and is preferably from 0.03 to 0.2 mm, more preferably from 0.06 to 0.1 mm in a case of using a relatively flexible film of e.g. polyethylene or polypropylene. When the thickness is at least 0.03 mm, deformation of the protective film can be suppressed when the protective film is peeled from the adhesive layer. When the thickness is at most 0.2 mm, the protective film is likely to sag at the time of peeling and is easily peeled.

In order that the protective films are more easily peeled from the first adhesive layer 4 and the second adhesive layer 5, a release agent such as a silicone may be applied to the first protective film 6 and the second protective film 7 within a range not to impair the first adhesive layer 4 and the second adhesive layer 5. It is preferred to use a first protective film 6 and a second protective film 7 larger than the transparent plate 2, in order that the edges of the first protective film 6 and the second protective film 7 are easily held when the protective films are peeled from the first adhesive layer 4 and the second adhesive layer 5.

(Display Device)

Figure 3:
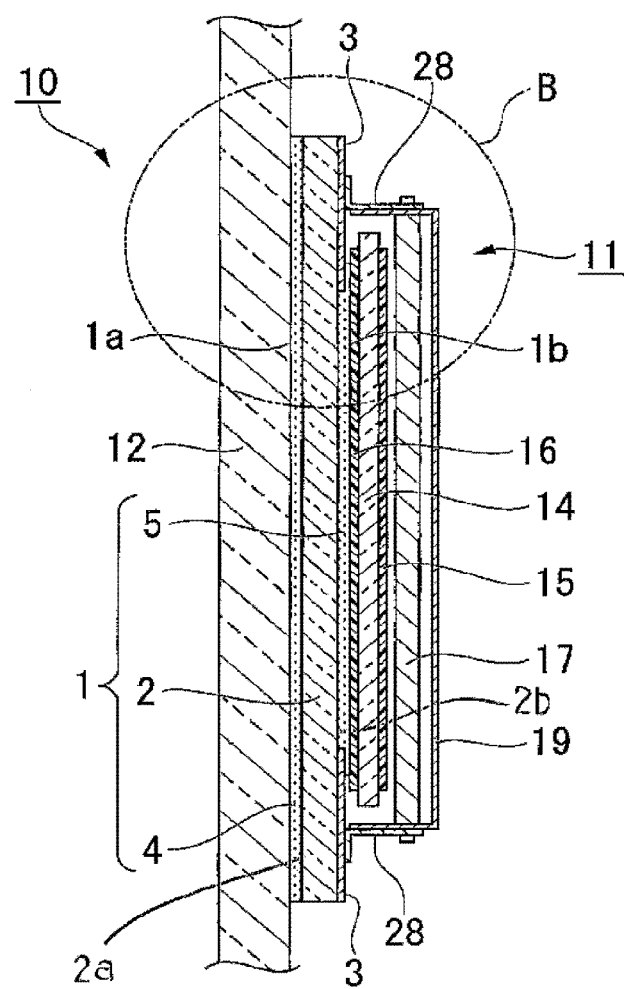
FIG. 3 is a cross-sectional view illustrating a display device comprising the adhesive layer-equipped transparent plate according to a first embodiment.
Figure 4:
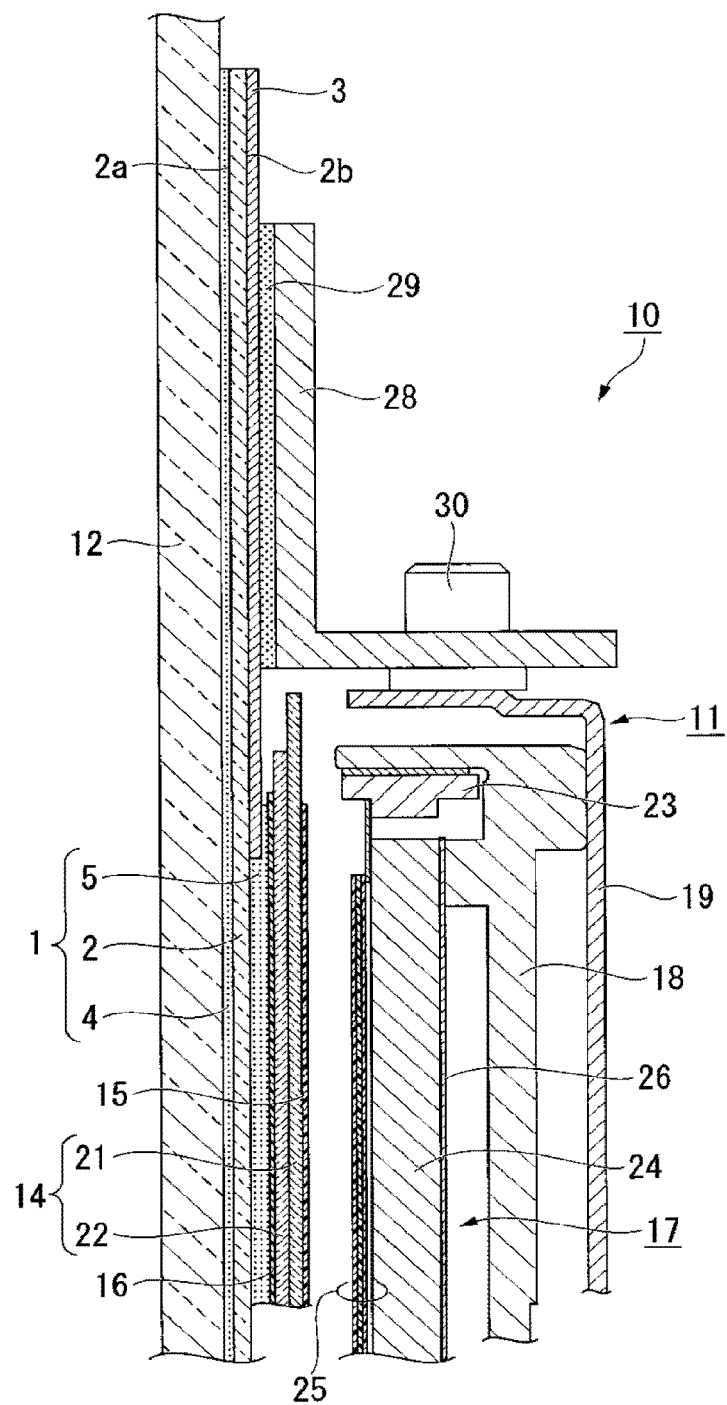
FIG. 4 is an enlarged cross-sectional view of the portion B in FIG. 3.

FIG. 3 is a cross-sectional view illustrating a display device comprising the adhesive layer-equipped transparent plate according to the first embodiment. FIG. 4 is an enlarged cross-sectional view of the portion B in FIG. 3. In FIG. 3, a backlight 17 portion is simplified for easy understanding.

As shown in FIGS. 3 and 4, the display device 10 according to the first embodiment comprises a display device main body 11, an adhesive layer-equipped transparent plate 1 and a transparent support 12. The transparent support 12 is bonded to a first surface 1a of the adhesive layer-equipped transparent plate 1 having a first adhesive layer 4 provided. The display device main body 11 is bonded to a second surface 1b of the adhesive layer-equipped transparent plate 1. In the first embodiment, the transparent support 12 is for example a window glass used in e.g. a store or an office. The display device main body 11 is a liquid crystal display device. The adhesive layer-equipped transparent plate 1 is one having the first protective film 6 and the second protective film 7 peeled from the adhesive layer-equipped transparent plate 1 shown in FIG. 2. The transparent plate 2 is bonded to the transparent support 12 via the first adhesive layer 4. The display device main body 11 is bonded to the transparent plate 2 via the second adhesive layer 5. Further, an adhesive layer-equipped transparent plate 1 having a touch sensor (not shown) provided on the transparent support 12 side of the transparent plate 2 may be used. In such a case, the display device 10 may be operated by touching the display device 10 from the outside of the transparent support 12.

As shown in FIG. 4, the display device main body 11 comprises a liquid crystal panel 14, a pair of polarizing plates 15 and 16, a backlight 17 (lighting unit), a frame 18 and a case 19. The liquid crystal panel 14 comprises a pair of glass substrates 21 and 22, and a liquid crystal (not shown) sealed in between the glass substrates 21 and 22. The drive system of the liquid crystal panel 14 is not particularly limited, and for example, an in-plane switching mode liquid crystal panel may be mentioned. The pair of glass substrates 21 and 22 comprises a TFT element substrate equipped with a thin film transistor (hereinafter referred to as TFT) and a color filter substrate equipped with a color filter.

The polarizing plates 15 and 16 are bonded to both the surfaces of the liquid crystal panel 14 to sandwich the liquid crystal panel 14. Further, an optical film such as a wave plate may be disposed between the liquid crystal panel 14 and each of the polarizing plates 15 and 16. The polarizing plate 16 on the opposite side from the backlight 17, between the polarizing plates 15 and 16, is bonded to the transparent plate 2 via the second adhesive layer 5, whereby the liquid crystal panel 14 is fixed to the transparent support 12.

The backlight 17 comprises a light-emitting device 23 such as a light-emitting diode (LED), a light guide plate 24 and as the case requires, one or more optical films 25 such as a prism sheet or a light diffusion sheet, and a mirror 26. Light emitted from the light emitting device 23 is reflected on the mirror 26 while it enters the light guide plate 24 and is transmitted through the interior of the light guide plate 24, and is emitted via the optical film 25 toward the liquid crystal panel 14. The optical film 25 has functions to uniformalize the intensity of light emitted from the light guide plate 24, to change the angular field of view, and to improve the light utilization efficiency. Accordingly, the optical film 25 and the liquid crystal panel 14 are disposed with an interval as the case requires.

Since the liquid crystal panel 14 is relatively light in weight, it is supported on the transparent support 12 only by bonding the image display region portion of the liquid crystal panel 14 to the transparent support 12 via the adhesive layer-equipped transparent plate 1. However, the weight of the backlight 17 increases in some cases if the size of the liquid crystal panel 14 is increased, and even if the liquid crystal panel 14 and the backlight 17 are fixed, the entire display device main body 11 can hardly be supported on the transparent support 12 in some cases only by bonding the liquid crystal panel 14 to the transparent support 12. In such a case, it is preferred to make the backlight 17 among the members constituting the display device main body 11, be supported on the transparent support 12 separately from the liquid crystal panel 14.

As a member to support the backlight 17 on the transparent support 12, in the case of the first embodiment, a support member 28 (angle) with an L-shaped cross section is used to fix the backlight 17 to the adhesive layer-equipped transparent plate 1. More specifically, the support member 28 to fix the backlight 17 is fixed to the light-shielding portion 3 on the second surface 2b of the transparent plate 2 by a double-coated adhesive tape 29. The backlight 17 is fixed to the frame 18, and the frame 18 is fixed to the case 19. The case 19 is fixed to the support member 28 by a bolt 30. By the above constitution, the backlight 17 is fixed to the transparent support 12 via the adhesive layer-equipped transparent plate 1.

As a procedure to bond the display device main body 11 the transparent support 12, the first protective film 6 is peeled from the adhesive layer-equipped transparent plate 1, the adhesive layer-equipped transparent plate 1 is bonded to the transparent support 12, and then the second protective film 7 is peeled, and the display device main body 11 is bonded to the adhesive layer-equipped transparent plate 1 bonded to the transparent support 12. Otherwise, the second protective film 7 is peeled from the adhesive layer-equipped transparent plate 1, the adhesive layer-equipped transparent plate 1 is bonded to the display device main body 11, and then the first protective film 6 is peeled, and the display device main body 11 to which the adhesive layer-equipped transparent plate 1 is bonded is bonded to the transparent support 12. At the time of bonding to the transparent support 12, the adhesive layer-equipped transparent plate 1, or the adhesive layer-equipped transparent plate 1 to which the display device main body 11 is bonded, may be bonded while it is curved entirely or locally. In such a case, it is preferred to bond the adhesive layer-equipped transparent plate 1 alone to the transparent support 12 first, since the adhesive layer-equipped transparent plate 1 is easily curved.

On the other hand, in some cases, the display device main body 11 bonded to the transparent support 12 is to be peeled from the transparent support 12. In such a case also, the bonded object is peeled while it is curved in some cases, and it is preferred to peel the display device main body 11 from the adhesive layer-equipped transparent plate 1 first and then peel the adhesive layer-equipped transparent plate 1 from the transparent support 12. Accordingly, the interfacial adhesive forces between the first adhesive layer 4 and the transparent support 12 and between the first adhesive layer 4 and the transparent plate 2 are preferably larger than the interfacial adhesive forces between the second adhesive layer 5 and the display device main body 11 and between the second adhesive layer 5 and the transparent plate 2. Further, it is preferred that after the adhesive layer-equipped transparent plate 1 is peeled, the first adhesive layer 4 will not remain on the transparent support 12, and the transparent support 12 i.e. a window glass will be restored to original state before the display device main body 11 is bonded. Accordingly, the interfacial adhesive force between the first adhesive layer 4 and the transparent support 12 is preferably smaller than the interfacial adhesive force between the first adhesive layer 4 and the transparent plate 2. In order to realize such a degree of the adhesive forces, the adhesive forces may be adjusted by the proportion of the monomer (B3) and the monomer (B4) in the curable compound, and the contents of the non-curable component and the chain transfer agent, as materials constituting the first adhesive layer 4 and the second adhesive layer 5. In a case where the object to be bonded is a glass plate, the interfacial adhesive strength can be increased by increasing the proportion of the monomer (B3) to the monomer (B4) or by suppressing the content of the non-curable component. Further, the adhesive strength to a glass surface can be increased also by increasing the content of the chain transfer agent.

(Function and Effect)

The adhesive layer-equipped transparent plate 1 according to this embodiment, has the first adhesive layer 4 to bond the adhesive layer-equipped transparent plate 1 to the transparent support 12 provided on the first surface 2a of the transparent plate 2, and the second adhesive layer 5 to bond the display device main body 11 provided on the second surface 2b of the transparent plate 2. Accordingly, when the display device main body 11 is bonded to the transparent support 12, it is not necessary to newly dispose an adhesive material or the like on the transparent plate 2, and bonding of the display device main body 11 can easily be carried out.

Further, in the display device 10 according to the first embodiment, the light-shielding portion 3 surrounding the image display region is provided on the adhesive layer-equipped transparent plate 1, e.g. wiring members connected to the liquid crystal panel 14 can be shielded without newly providing a light-shielding portion. Particularly in the first embodiment, since the light-shielding portion 3 is provided on the second surface 2b of the transparent plate 2, the distance between the light-shielding portion 3 and the image display surface in a depth direction is short. Thus, an observer will not feel that the display recedes deep relative to a frame portion consisting of the light-shielding portion 3, and a decrease in visibility of the display by a difference in level of the frame portion and the image display surface can be prevented.

Instead of the structure of the first embodiment, for example, a constitution may be conceivable such that the second adhesive layer 5 is formed large enough to cover the light-shielding portion 3 on the entire second surface 2b of the transparent plate 2, and the support member 28 is fixed on the second adhesive layer 5. However, the shear modulus of the second adhesive layer 5 is adjusted to be lower than that of a conventional adhesive layer, in order that air bubbles formed when the second adhesive layer 5 and the display device main body 11 are bonded will easily disappear. Accordingly, it is very difficult to fix the support member 28 supporting the weight of the backlight 17 by the second adhesive layer 5. Whereas in the constitution of the first embodiment, the second adhesive layer 5 is formed at a part on a center portion on the second surface 2b of the transparent plate 2 and the light-shielding portion 3 is exposed, and the support member 28 is fixed to the light-shielding portion 3 by the double-coated adhesive tape 29. As a result, the display device main body 11 including the backlight 17 can be strongly fixed.

[Second Embodiment]

Now, the second embodiment of the present invention will be described with reference to FIGS. 5 and 6.

The basic constitution of the adhesive layer-equipped transparent plate according to the second embodiment is the same as the first embodiment, and the surface on which the light-shielding portion is formed on the transparent plate is different from the first embodiment.

Figure 5:
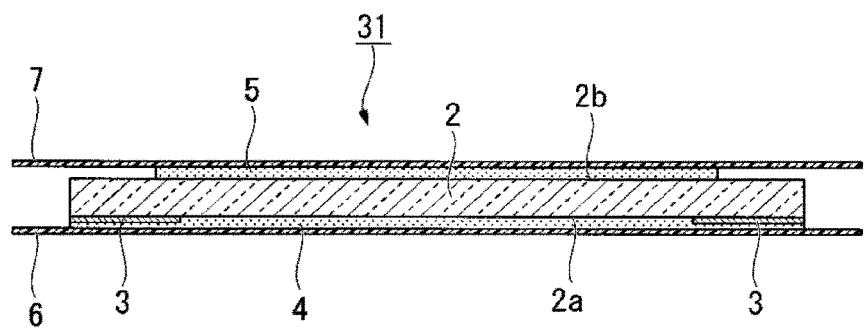
FIG. 5 is a cross-sectional view illustrating an adhesive layer-equipped transparent plate according to a second embodiment.
Figure 6:
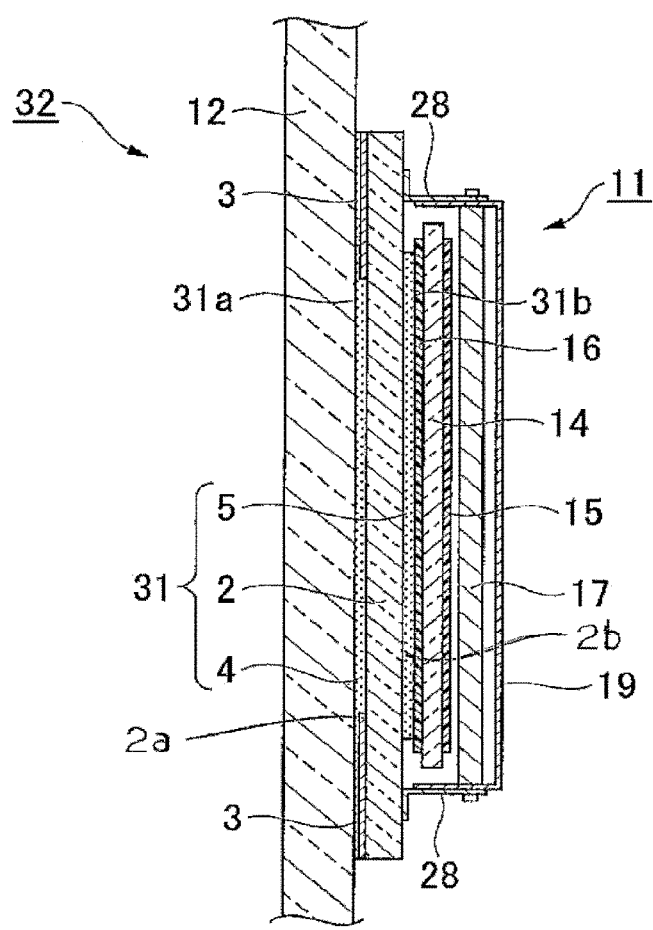
FIG. 6 is a cross-sectional view illustrating a display device comprising the adhesive layer-equipped transparent plate according to a second embodiment.

In FIGS. 5 and 6, the same components as in those in FIGS. 1 to 4 described in the first embodiment are represented by the same symbols, and their detailed description is omitted.

As shown in FIG. 5, an adhesive layer-equipped transparent plate 31 according to the second embodiment comprises a transparent plate 2, a light-shielding portion 3, a first adhesive layer 4, a second adhesive layer 5, a first protective film 6 and a second protective film 7. The light-shielding portion 3 is provided on the periphery of a first surface 2a of the transparent plate 2. The first adhesive layer 4 is provided so as to cover the light-shielding portion 3 on the entire first surface 2a of the transparent plate 2. The second adhesive layer 5 has a formation area smaller than that of the first adhesive layer 4, and is provided on a second surface 2b of the transparent plate 2. The area and the shape of the region on which the second adhesive layer 5 is formed are the same as those in the first embodiment. That is, the second adhesive layer 5 is provided on both a region surrounded by the frame-form light-shielding portion 3 and a region planarly overlapping with a part of the light-shielding portion 3, when observed from a normal direction of the transparent plate 2 through the transparent plate 2. The other constitution of the adhesive layer-equipped transparent plate 31 is the same as in the first embodiment.

As shown in FIG. 6, a display device 32 according to the second embodiment comprises a display device main body 11, the adhesive layer-equipped transparent plate 31 and a transparent support 12. The transparent support 12 is bonded to a first surface 31a of the adhesive layer-equipped transparent plate 31. The display device main body 11 is bonded to a second surface 31b of the adhesive layer-equipped transparent plate 31. In the second embodiment also, the transparent support 12 is for example a window glass to be used for a store, an office or the like, and the display device main body 11 is for example a liquid crystal display device. The adhesive layer-equipped transparent plate 31 is one having the first protective film 6 and the second protective film 7 peeled from the adhesive layer-equipped transparent plate 31 as shown in FIG. 4. The transparent plate 2 is bonded to the transparent support 12 via the first adhesive layer 4. The display device main body 11 is bonded to the transparent plate 2 via the second adhesive layer 5.

According to the second embodiment also, the same effects as in the first embodiment, such that bonding of the display device main body can easily be carried out, a decrease in display visibility can be suppressed, etc., can be obtained.

The second embodiment is different from the first embodiment in that a support member 28 to support a backlight 17 is directly bonded to the second surface 2b of the transparent plate 2 since the light-shielding portion 3 is formed on the first surface 2a of the transparent plate 2. That is, in the second embodiment, the support member 28 is directly bonded to the surface of a glass plate or a resin plate constituting the transparent plate 2 not via the light-shielding portion 3. Accordingly, by the constitution of the second embodiment, the adhesion between an angle 28 and the transparent plate 2 can be increased, and the reliability of fixing of the display device main body can further be increased, as compared with the constitution of the first embodiment in which the angle 28 is fixed to the transparent plate 2 via the light-shielding portion 3.

The present invention is not limited to the above specific embodiments, and various modifications are possible without depart from the intention and the scope of the present invention.

For example, in the above embodiments, as the light-shielding portion of the adhesive layer-equipped transparent plate, a frame-form light-shielding portion surrounding all the four sides of the rectangular transparent plate is mentioned as an example, however, it may not be a frame-form light-shielding portion surrounding all the four sides. For example, a light-shielding portion disposed along two opposing sides may be used. Further, as the transparent support constituting the display device, a window glass to be used in a store, an office or the like may be mentioned as an example, however, instead of a window glass, a movable member such as a glass partition partitioning a room may be used as the transparent support, and a display device main body is bonded to the transparent support.

Further, the present invention has been specifically described with reference to a liquid crystal display in FIGS. 3 to 6 as the display device main body, however, in addition to the liquid crystal display, an organic EL display, a plasma display, an electronic paper display, etc. may be used. Further, the shape, number, arrangement, material, etc. of each of the elements constituting the adhesive layer-equipped transparent plate and the display device are not limited to the above embodiments, and various modifications are possible.

INDUSTRIAL APPLICABILITY

The present invention is applicable for various display devices such as a liquid crystal display, an organic EL display, a plasma display and an electronic paper display, and an adhesive layer-equipped transparent plate used to bond such display devices to a transparent support.

This application is a continuation of PCT Application No. PCT/JP2014/079371 filed on Nov. 5, 2014, which is based upon and claims the benefit of priority from Japanese Patent Application No. 2013-236910 filed on Nov. 15, 2013. The contents of those applications are incorporated herein by reference in their entireties.

REFERENCE SYMBOLS 1, 31: adhesive layer-equipped transparent plate, 2: transparent plate, 3: light-shielding portion, 4: first adhesive layer, 5: second adhesive layer, 10, 32: display device, 11, display device main body, 12: transparent support, 14: liquid crystal panel, 17: backlight (lighting unit), 28: support member (angle)

What is claimed is:

1. A display device, comprising:
    an adhesive layer-equipped transparent plate having a first surface and a second surface,
    a transparent support bonded to the first surface of the transparent plate, and
    a display device main body bonded to the second surface of the transparent plate,
    wherein the transparent plate comprises a light-shielding portion provided on at least one of the periphery of the first surface and the periphery of the second surface of the transparent plate, a first adhesive layer provided on the first surface of the transparent plate, and a second adhesive layer provided on the second surface of the transparent plate in a formation region with an area smaller than a formation region of the first adhesive layer,
    wherein as observed from a normal direction of the first surface, the second adhesive layer has an edge positioned on an inners side of an edge of the first adhesive layer and overlapping with the light-shielding portion,
    wherein the transparent support is at least one selected from the group consisting of a window glass, a glass wall, and a glass partition,
    wherein the transparent support is bonded to the transparent plate via the first adhesive layer,
    wherein the display device main body is bonded to the transparent plate via the second adhesive layer,
    wherein the transparent plate has a thickness of from greater than 0.2 mm to 2.0 mm,
    and
    wherein the first adhesive layer and the second adhesive layer each independently has a thickness of from 0.2 to 2 mm.

2. The display device according to claim 1, wherein the first adhesive layer is present on the entire first surface of the transparent plate.

3. The display device according to claim 1, wherein the light-shielding portion is present on the periphery of the second surface, and the second adhesive layer is present on both a region surrounded by the light-shielding portion and a region planarly overlapping with a part of the light-shielding portion.

4. The display device according to claim 1, wherein each of the shear moduli of the first adhesive layer and the second adhesive layer is from $10^2$ to $10^5$ Pa.

5. The display device according to claim 1, wherein the interfacial adhesive forces between the first adhesive layer and the transparent support and between the first adhesive layer and the transparent plate are larger than the interfacial adhesive forces between the second adhesive layer and the display device main body and between the second adhesive layer and the transparent plate.

6. The display device according to claim 5, wherein the interfacial adhesive force between the first adhesive layer and the transparent support is smaller than the interfacial adhesive force between the first adhesive layer and the transparent plate.

7. The display device according to claim 1, which further has a support member supporting a part of the display device main body, fixed to a region other than the formation region of the second adhesive layer on the second surface of the transparent plate.

8. The display device according to claim 1, wherein the light-shielding portion is provided on the first surface of the transparent plate, and the support member is fixed to the second surface of the transparent plate.

9. The display device according to claim 1, wherein the light-shielding portion is provided on the second surface of the transparent plate, and the support member is fixed to the light-shielding portion.

10. The display device according to claim 1, wherein the glass plate is a chemically tempered glass plate.

11. The display device according to claim 1, wherein the second adhesive layer has a thickness larger than the first adhesive layer.

12. The display device according to claim 1, wherein the transparent plate thickness is from greater than 0.2 mm to 0.7 mm.

13. The display device according to claim 1, wherein the first adhesive layer has a thickness of from 0.2 to 0.8 mm.

14. The display device according to claim 1, wherein adhesion on the adhesive face of each of the first adhesive layer and the second adhesive layer is from 0.01 to 1 N, with a test specimen having a width of 50 mm in 180° peel test at a peel rate of 300 mm/min with respect to an acrylic plate.

* * * * *